United States Patent
McCabe

(10) Patent No.: US 8,027,420 B2
(45) Date of Patent: Sep. 27, 2011

(54) APPARATUS AND METHOD FOR TRANSFERRING A SIGNAL FROM A FAST CLOCK DOMAIN TO A SLOW CLOCK DOMAIN

(75) Inventor: Patrick A. McCabe, Crystal Beach, FL (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 828 days.

(21) Appl. No.: 12/051,067

(22) Filed: Mar. 19, 2008

(65) Prior Publication Data

US 2009/0238317 A1 Sep. 24, 2009

(51) Int. Cl.
*H04L 7/00* (2006.01)
*H04L 23/00* (2006.01)

(52) U.S. Cl. ......................................... 375/354; 375/377

(58) Field of Classification Search .......... 375/354–356, 375/358, 295, 316, 359, 360, 377; 377/77–78, 377/80; 327/141–142, 144, 155, 176; 713/400, 713/500, 502, 600; 710/61, 20, 21; 370/304, 370/350

See application file for complete search history.

(56) References Cited

U.S. PATENT DOCUMENTS

| | | | | |
|---|---|---|---|---|
| 6,097,775 A | * | 8/2000 | Weber | 375/354 |
| 6,999,542 B1 | * | 2/2006 | Korger et al. | 375/354 |
| 7,116,601 B2 | | 10/2006 | Fung | |
| 7,161,999 B2 | * | 1/2007 | Parikh | 375/354 |
| 7,260,166 B2 | * | 8/2007 | Sweet | 375/354 |
| 7,289,946 B1 | | 10/2007 | Lee | |
| 7,352,836 B1 | * | 4/2008 | Mendenhall | 375/372 |
| 2002/0150189 A1 | * | 10/2002 | Ware et al. | 375/354 |
| 2003/0237014 A1 | * | 12/2003 | Rangam | 713/502 |
| 2006/0098770 A1 | * | 5/2006 | Harper et al. | 375/356 |

OTHER PUBLICATIONS

Williams et al., Low Latency clock domain Transfer for Simultaneously Mesochronous, Plesiochronous and Heterochronous Interfacces, 2007, Asynchronous Circuits and systems, 2007. ASYNC 2007. 13th IEEE International Symposium on, pp. 196-204.*

* cited by examiner

*Primary Examiner* — Tesfaldet Bocure
*Assistant Examiner* — Lawrence Williams
(74) *Attorney, Agent, or Firm* — RatnerPrestia

(57) ABSTRACT

A circuit is provided for transferring a signal from a fast clock domain to a slow clock domain. The circuit includes a fast clock domain configured to receive an input signal and, responsively, transfer an intermediate signal. The circuit also a slow clock domain configured to receive the transferred intermediate signal from the fast clock domain and, responsively, generate an output signal. The circuit further includes a first synchronizer disposed in the slow clock domain and a second synchronizer disposed in the fast clock domain. The first synchronizer, operating with a slow clock, is configured to receive the intermediate signal and, responsively, provide the output signal as a transferred signal which is synchronized to the input signal. The second synchronizer, operating with a fast clock, is configured to receive a feedback signal from the first synchronizer for acknowledging synchronization of the output signal to the input signal.

21 Claims, 6 Drawing Sheets

APPARATUS AND METHOD FOR TRANSFERRING A SIGNAL FROM A FAST CLOCK DOMAIN TO A SLOW CLOCK DOMAIN

BACKGROUND OF THE INVENTION

Digital circuits may include multiple clock domains having different frequencies. When the signals cross from one clock domain to another clock domain, the signals need to be synchronized. If the signals are not synchronized, signal values may be indeterminate when sampled by the other clock domain due to metastability.

FIG. 1 depicts a conventional circuit for synchronizing signals from one clock domain to another clock domain. As shown at FIG. 1, two D-type flip-flops ("double register") are each clocked by the receiving clock domain. The synchronizer shown at FIG. 1, however, is limited to synchronizing signals where the clock frequencies of the sending and receiving clock domains are approximately the same or when the sending clock domain is slower than the receiving clock domain.

FIG. 2 depicts a timing diagram illustrating the results of signals sent and received using the conventional circuit of FIG. 1 when the sending clock domain is faster (i.e. on the order of 2× or more) than the receiving clock domain. As shown at FIG. 2, both the sending and receiving logic use the rising edges of their clocks to generate and sample the signal crossing from one clock domain to the other.

When the sending clock domain is faster than the receiving clock domain, signals of short duration that are sent by the faster sending clock domain may be missed entirely by the slower receiving clock domain, resulting in an unreliable transfer of data or control signals from the fast clock domain to the slower clock domain. Further, the simple synchronizer in FIG. 1 does not provide means for the sending logic to determine when it is safe to generate a new signal to be sent to the receiving logic. Accordingly, there is a need for more efficient and accurate synchronizing logic.

SUMMARY OF THE INVENTION

The present invention provides a circuit for transferring a signal from a fast clock domain to a slow clock domain. The circuit comprises a fast clock domain configured to receive an input signal and, responsively, transfer an intermediate signal. The circuit also includes a slow clock domain configured to receive the intermediate signal from the fast clock domain and, responsively, generate an output signal. The circuit further includes a first synchronizer disposed in the slow clock domain and a second synchronizer disposed in the fast clock domain. The first synchronizer, operating with a slow clock, is configured to receive the intermediate signal and, responsively, provide the output signal as a transferred signal which is synchronized to the input signal. The second synchronizer, operating with a fast clock, is configured to receive a feedback signal from the first synchronizer for acknowledging synchronization of the output signal to the input signal.

The present invention further provides a circuit for capturing a pulse transferred from a fast clock domain to a slow clock domain. The circuit includes a set-reset element, disposed in the fast clock domain, for detecting an input pulse and setting a capture period upon detection of the input pulse. The circuit also includes a first synchronizer, disposed in the slow clock domain, for synchronizing to the detected input pulse, after setting of the capture period, and, responsively, providing an output terminal pulse. The circuit further includes a second synchronizer, disposed in the fast clock domain, for synchronizing to the first synchronizer and, responsively, providing an acknowledgment signal. The set-reset element resets the capture period after receiving the acknowledgment signal.

The present invention further provides a method of capturing a pulse, sent by a fast clock domain and received by a slow clock domain. The method comprises setting a time period, by the fast clock domain, upon detection of an input pulse and notifying the slow clock domain, by the fast clock domain, of the set time period. The method also includes generating an output pulse, by the slow clock domain, in synchronism to the input pulse, upon notification of the set time period and acknowledging synchronism to the input pulse to the fast clock domain, from the slow clock domain. The method further includes resetting the time period, by the fast clock domain, upon receipt of the acknowledgment from the slow clock domain.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

The invention is best understood from the following detailed description when read in connection with the accompanying drawing figures, which shows exemplary embodiments of the invention selected for illustrative purposes. The invention will be illustrated with reference to the figures. Such figures are intended to be illustrative rather than limiting and are included herewith to facilitate the explanation of the present invention.

According to an exemplary embodiment of the invention, a reliable transfer of signals is provided from a fast clock domain to a slow clock domain by preserving a characteristic (i.e. a pulse or a level) of the signals. An essential characteristic of the signal sent from the fast clock domain to the slow clock domain (a pulse or a level) may be preserved after crossing the clock domain.

According to another exemplary embodiment of the invention, a synchronized feedback strobe may be provided from the slow domain to the fast domain to enable generation of a new signal from the fast domain to the slow domain. The synchronized feedback strobe may be sent via a feedback circuit to the fast domain to control the generation of additional pulses or signal levels from the fast domain to the slow domain.

According to yet another exemplary embodiment of the invention, logic external to the synchronizer in the fast clock domain may use the feedback signal as an enable to generate a new input signal to be synchronized with the slow clock domain. For example, an enable circuit may be provided for enabling or inhibiting an input pulse to be transferred from the fast clock domain to the slow clock domain.

Figure 1:
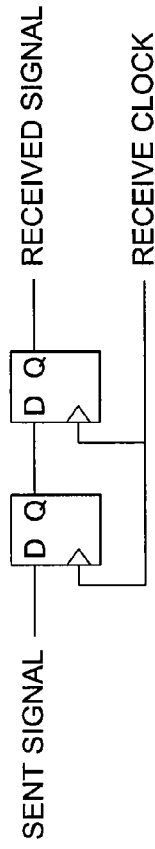
FIG. 1 depicts a conventional circuit for synchronizing signals from one clock domain to another clock domain.
Figure 2:
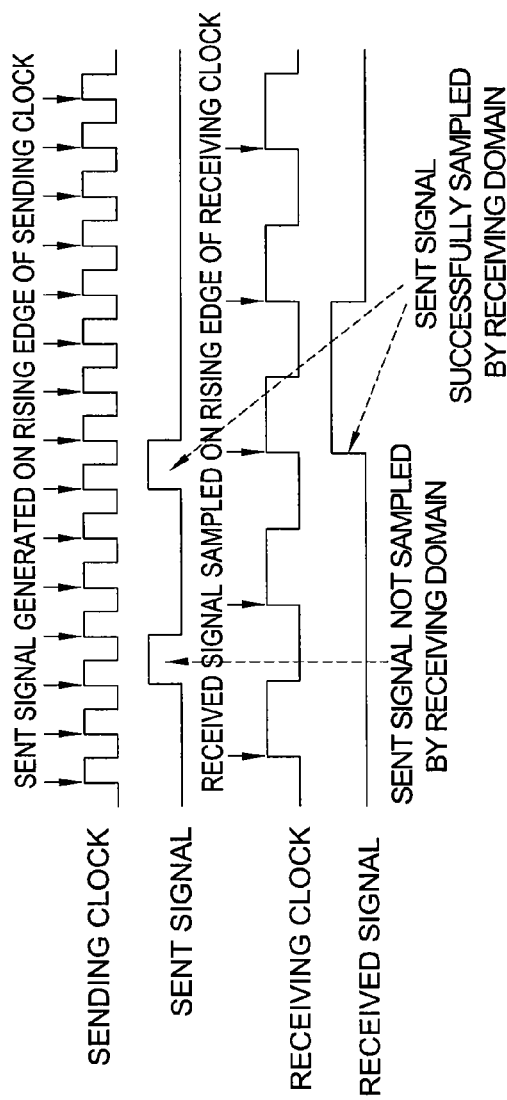
FIG. 2 depicts a timing diagram illustrating the results of signals sent and received using the conventional circuit of FIG. 1.
Figure 3:
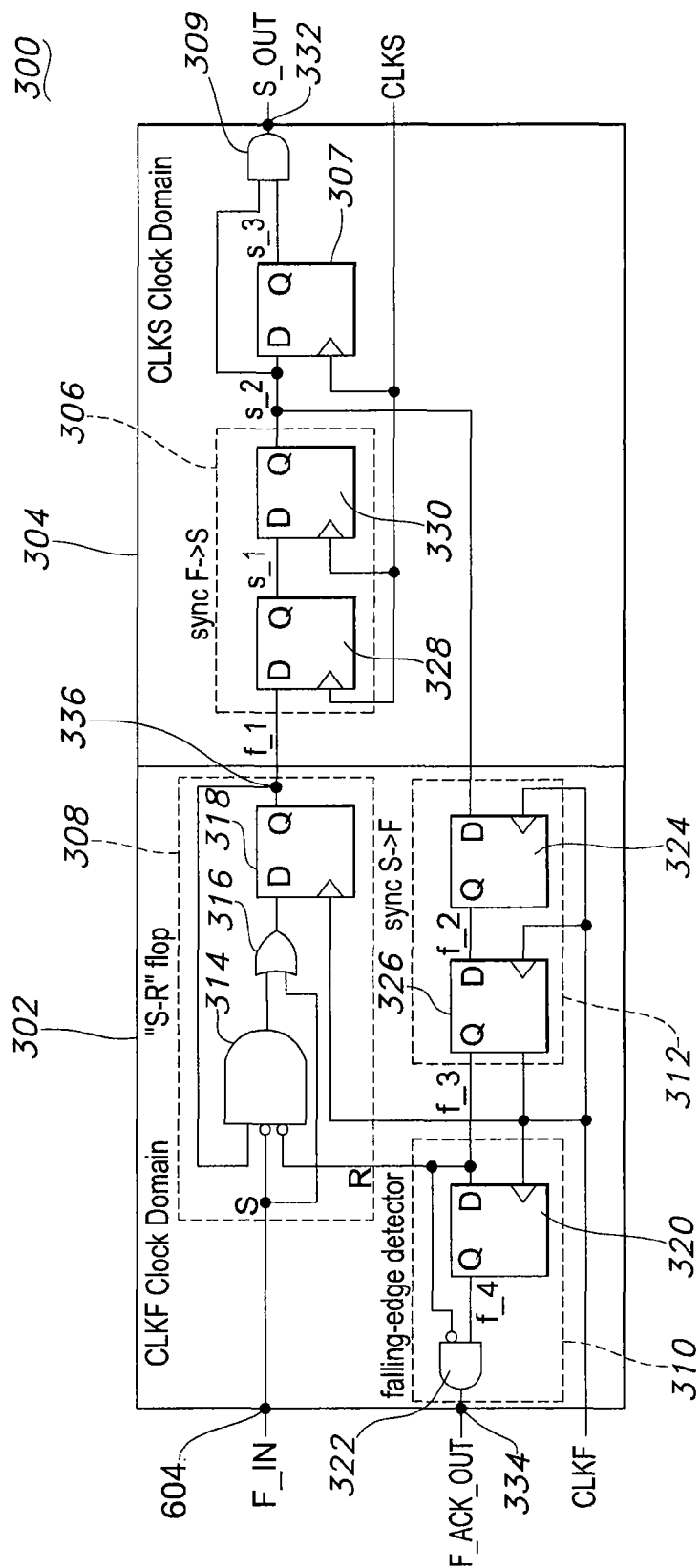
FIG. 3 depicts an exemplary circuit including a fast clock domain and a slow clock domain according to an embodiment of the invention.

FIG. 3 depicts an exemplary circuit 300 according to one embodiment of the invention. As shown at FIG. 3, exemplary circuit 300 may include fast clock domain 302 and slow clock domain 304. The slow clock domain 304 may include first synchronizer (F-S) 306 which synchronizes to a signal arriving from the fast clock domain. The slow clock domain 304 may also include D flip-flop 307 and AND-gate 309. The fast clock domain 302 may include a set-reset circuit (S-R flop) 308, a falling-edge detector 310 and a second synchronizer (sync S-F) 312. The second synchronizer 312 synchronizes to a signal arriving from the slow clock domain.

The set-reset circuit 308 may include AND-gate 314, OR-gate 316 and D flip-flop 318. The falling-edge detector 310 may include D flip-flop 320 and AND-gate 322. Second synchronizer 312 may include D flip-flops 324 and 326. First synchronizer 306 may include D flip-flops 328 and 330.

The AND-gate 314 may include three input terminals. The first input terminal may be a "NOT" terminal connected to F_IN input terminal 604. The second input terminal may also be a "NOT" terminal connected to the output terminal of second synchronizer 312. The third input terminal may be connected to output terminal 336 of set-reset circuit 308. OR-gate 316 may include two input terminals. The first input terminal may be connected to F_IN input terminal 604. The second input terminal may be connected to the output terminal of AND-gate 314. The D flip-flop 318 may include a D-input terminal connected to the output terminal of OR-gate 316 and a clock-input terminal connected to the fast clock.

The D flip-flop 328 may include a D-input terminal connected to output terminal 336 set-reset circuit 308 and a clock-input terminal connected to the slow clock CLKS. D flip-flop 330 may include a D-input terminal connected to the Q-output terminal of D flip-flop 328 and a clock-input terminal connected to the slow clock CLKS. The D flip-flop 307 may include a D-input terminal connected to the output terminal of the first synchronizer 306 and a clock-input terminal connected to the slow clock. The AND-gate 309 may include two input terminals. The first input terminal may be connected to the output terminal of first synchronizer 306 and the second input terminal may be connected to the Q-output terminal of D flip-flop 307. The slow clock domain 304 may include an output terminal S_OUT 332 connected to the output terminal of AND-gate 309.

The D flip-flop 324 may include a D-input terminal connected to the output terminal of the first synchronizer 306 and a clock-input terminal connected to the fast clock CLKF. The D flip-flop 326 may include a D-input terminal connected to the Q-output terminal of D flip-flop 324 and a clock-input terminal connected to the fast clock CLKF. The D flip-flop 320 may include a D-input terminal connected to the Q-output terminal of D flip-flop 326 and a clock-input terminal connected to the fast clock CLKF. The AND-gate 322 may include two input terminals. The first input terminal may be a "NOT" terminal connected to the Q-output terminal of D flip-flop 326. The second input terminal may be connected to the Q-output of D flip-flop 320. The fast clock domain 302 may include an output terminal acknowledgement terminal (F_ACK_OUT) 334 connected to the output terminal of AND-gate 322.

According to an exemplary embodiment of the invention, the fast clock domain 302 of circuit 300 may be configured to receive an input signal F_IN at F_IN input terminal 604 and, responsively, transfer an intermediate signal f_1 to slow clock domain 304. Input terminal signal F_IN may be clocked in the fast clock domain using the rising edge (for example) of the fast clock signal. In order to reliably transfer the value of the F_IN signal, the fast clock domain 302 of circuit 300 may include a set-reset element (i.e. set-reset circuit 308) formed from a standard D-type flip-flop 318, with additional logic (i.e. AND-gate 314 and OR-gate 316) at the front-end of flip-flop 318 to provide the set-reset behavior, with reset taking priority over set. The set-reset circuit 308 may be coupled between F_IN input terminal 604 and output terminal 336 providing the intermediate signal f_1.

In operation, set-reset circuit 308 may receive the input signal F_IN, generate the intermediate signal f_1, and reset the intermediate signal f_1 after a predetermined delay time period. The set-reset circuit 308 captures the F_IN signal. When the F_IN signal is asserted, set-reset circuit 308 may set D flip-flop 318 to a '1' value. The '1' value may be fed back from output terminal 336 to AND-gate 314 to hold the value in D flip-flop 318, if set.

When the output terminal f_1 of the set-reset circuit 308 crosses over to the slow clock domain 304, f_1 may be sampled by a "double register" synchronizing circuit (i.e. first synchronizer 306), clocked by the slow clock CLKS. The output s_2 of first synchronizer 306 may be sampled by D flip-flop 307, also clocked by slow clock CLKS. The output s_3 of D flip-flop 307 may be conditioned by AND-gate 309 to ensure that the output S_OUT is not asserted for longer than necessary (S_OUT=s_2 AND s_3). If the F_IN signal is asserted for only one CLKF cycle, then the S_OUT signal may be asserted for only one CLKS cycle, thus preserving a clock cycle characteristic (pulse or level) between the input signal F_IN and output signal S_OUT.

The s_2 signal may be fed back to the fast clock domain 302 in order to generate a feedback signal. The s_2 signal may be sampled by a conventional "double register" synchronizing circuit (i.e. second synchronizer 312), clocked by the fast clock CLKF. The output f_3 of second synchronizer 312 may be sampled by D flip-flop 320, which is also clocked by fast clock CLKF. The output terminal f_4 of D flip-flop 320 may be conditioned by AND-gate 322, for detecting the falling edge of signal f_3.

The AND-gate 322 of falling edge detector 310 may generate the F_ACK_OUT signal. When F_ACK_OUT is active, it indicates that the F_IN signal has successfully passed to the slow clock domain. Thus, a new F_IN value may be generated. The synchronized signal f_3 may also be sent to set-reset circuit 308 for reset.

Figure 4:
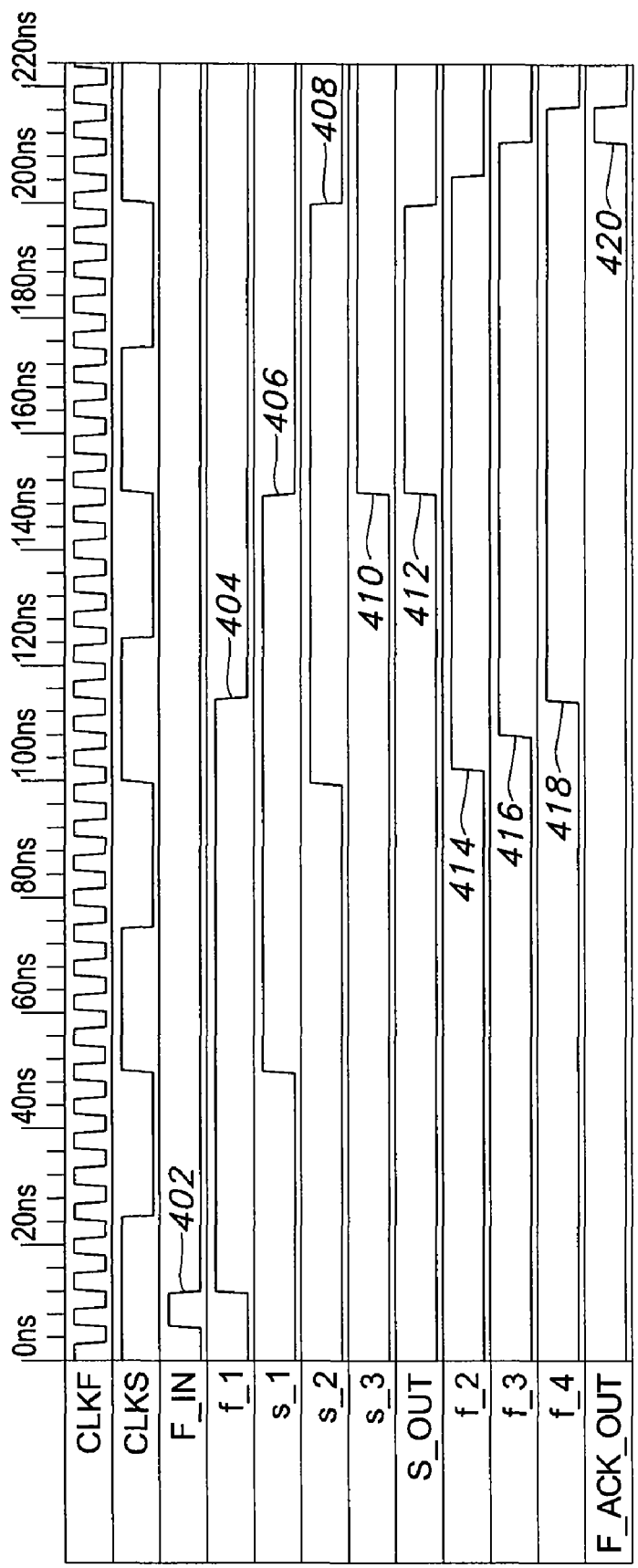
FIG. 4 depicts a timing diagram of the transfer of a single-cycle pulse from a fast clock domain to a slow clock domain using the exemplary circuit shown in FIG. 3.

According to an exemplary embodiment of the invention, FIG. 4 is a timing diagram of a transfer of a single-cycle pulse from the fast clock domain 302 to the slow clock domain 304 using the exemplary circuit shown in FIG. 3. As shown at FIG. 4, a single-cycle pulse 402 may be generated at the F_IN input terminal in the fast clock domain 302. The set-reset circuit 308 may set or begin a capture period upon detection of the input signal F_IN.

In operation, intermediate signal f_1 generated by the set-reset circuit 308 may be received by D flip-flop 328 of first synchronizer 306 in the slow clock domain 304. On the rising edge of the next slow clock CLKS, signal s_1 406 may be generated by D flip-flop 328. The signal s_1 406, output by D flip-flop 328 may be received by D flip-flop 330. On the rising edge of the next slow clock CLKS, signal s_2 408 may be generated by D flip-flop 330 as an output of first synchronizer 306. The output s_2 408 of first synchronizer 306 may then be sampled by D flip-flop 307. That is, a rising edge of input signal F_IN has been delayed by a number of slow clock cycles. The number of slow clock cycles depend on the number of serially coupled registers (i.e. D flip-flops 318, 328 and 330).

Signal s_3 410 may be finally generated by D flip-flop 330 on the rising edge of the next slow clock CLKS. Signal s_2 408 and signal s_3 410 may then be received by AND-gate 309 to generate S_OUT output 412. Thus, the single-cycle F_IN pulse 402 generated at F_IN terminal may be transferred to S_OUT output terminal 412 in the slow clock domain 304 as a single-cycle pulse 412.

Subsequent to the generation of the output pulse in the slow clock domain, the signal, F_ACK_OUT, may be generated in the fast clock domain 302. Signal s_2 408, outputted by a first synchronizer 306, may be fed back to the fast clock domain 302 and received by D flip-flop 324 of second synchronizer 312. Signal f_2 414 may then be outputted by D flip-flop 324 on the rising edge of the next fast clock cycle. The D flip-flop 326 may receive signal f_2 414 and output signal f_3 416 on the rising edge of the next fast clock cycle. That is, second synchronizer 312 delays signal s_2 408 by a number of fast clock cycles, for example, by at least two fast clock cycles.

Signal f_3 416 may then be received by AND-gate 314 of set-reset circuit 308 as a reset signal. That is, the reset signal is used by the set-reset circuit 308 to reset or end the capture period described above.

According to an exemplary embodiment of the invention, an acknowledgement signal F_ACK_OUT 420 may be provided. Signal f_3 416 may be received by D flip-flop 320 of falling edge detector 310. On the rising edge of the next fast clock signal, signal f_4 418 may be generated by D flip-flop 320. Signal f_3 416 may be received at a "NOT" terminal of AND-gate 322, while signal f_4 418 may be received at another input terminal of AND-gate 322 to provide F_ACK_OUT 420. After F_ACK_OUT is generated, the fast clock domain 302 may safely pass a new pulse to the slow clock domain 304.

Figure 5:
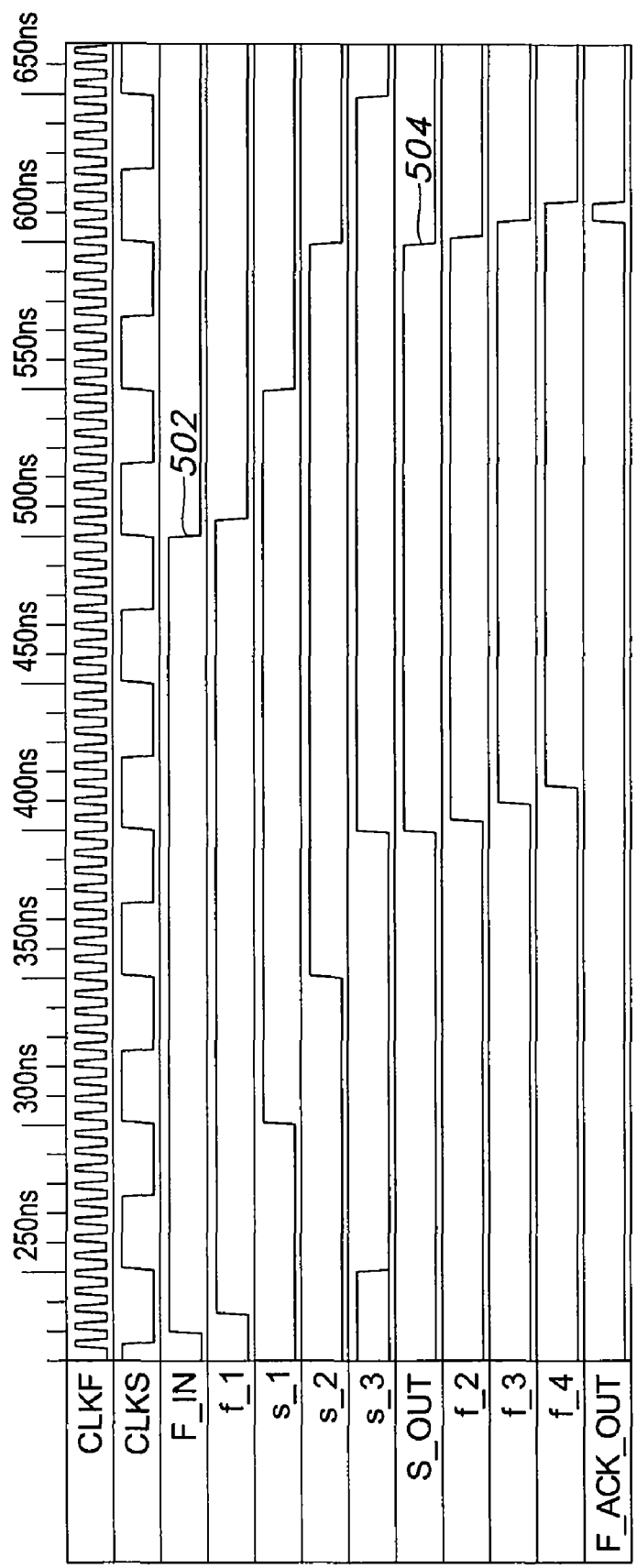
FIG. 5 depicts a timing diagram of the transfer of a multi-cycle pulse from a fast clock domain to a slow clock domain using the exemplary circuit shown in FIG. 3.

According to another exemplary embodiment of the invention, an input terminal signal having a width of multiple fast clock cycles in a fast clock domain may be transferred to a slow clock domain. FIG. 5 depicts a timing diagram of the transfer of such a multi-cycle pulse from the fast clock domain to the slow clock domain using the exemplary circuit shown in FIG. 3.

The signals shown in the timing diagram depicted at FIG. 5 are similar to the signals shown at the timing diagram depicted at FIG. 4. Thus, a detailed description of all of the signals in FIG. 5 is omitted. The input pulse 402 shown at FIG. 5, however, differs from the input pulse 402 at FIG. 4 in that pulse 502, generated at the F_IN input terminal, has a width multiple cycles of fast clock CLKF. Multi-cycle pulse 502 is then transferred as the S_OUT output 504. The output signal S_OUT 504 may have a width of multiple cycles of slow clock CLKS, as shown at FIG. 5.

It is contemplated, however, that an output signal in a slow clock domain transferred from an input signal in a fast clock domain having a width of multiple fast clock cycles may have a width of one slow clock cycle. It is also contemplated that an output signal in a slow clock domain transferred from an input signal in a fast clock domain having a width of multiple fast clock cycles may have a width of at least one half of a difference between the width of a fast clock pulse and a slow clock pulse.

Figure 6:
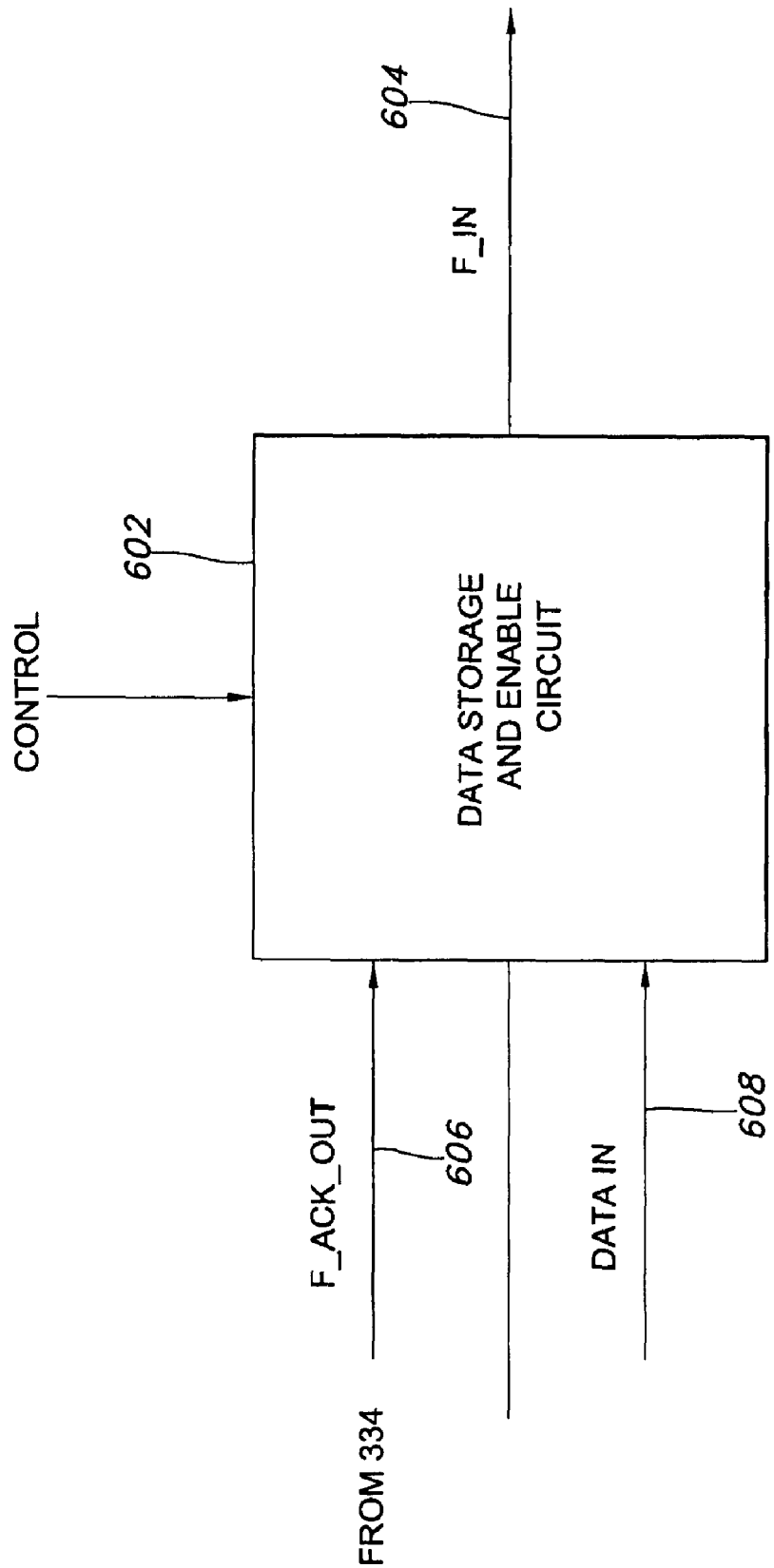
FIG. 6 depicts an exemplary enable circuit according to an embodiment of the invention.

FIG. 6 depicts an exemplary data storage and enable circuit according to one embodiment of the invention. As shown in FIG. 6, data storage and enable circuit 602 may be used by the fast clock domain 302 to prevent input terminal pulse F_IN 604 to be transferred to the fast clock domain 302. As described above with reference to FIGS. 4 and 5, the input terminal pulse F_IN 604 may be a single-cycle pulse or a multi-cycle pulse. A data signal DATA_IN 608 may provided to data storage and enable circuit 602. An acknowledgement signal F_ACK_OUT 606 may also be provided to enable circuit 602 for enabling the input pulse F_IN 604 to be transferred from the fast clock domain 302 to the slow clock domain 304.

According to an exemplary embodiment, the data signal DATA_IN 608 may be stored at data storage and enable circuit 602 until the acknowledgement signal F_ACK_OUT 606 is received at the data storage and enable circuit 602. It also contemplated that the data signal may be stored at different locations (i.e. separate from the data storage and enable circuit 602). When the acknowledgement signal F_ACK_OUT 606 is received, the data storage and enable circuit 602 may be controlled to provide the input pulse F_IN 604 to be transferred from the fast clock domain 302 to the slow clock domain 304.

Figure 7:
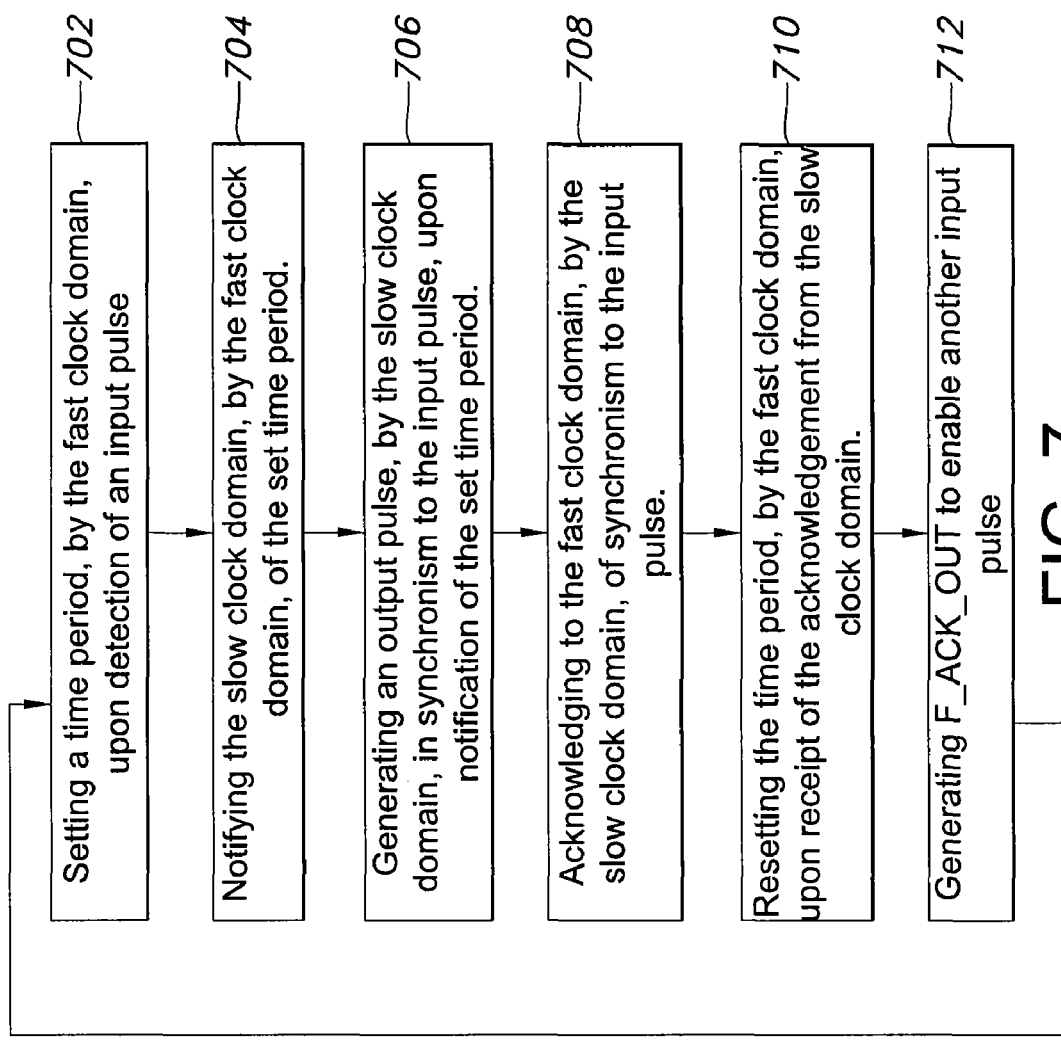
FIG. 7 depicts a flow chart of an exemplary method for capturing a pulse, sent by a fast clock domain and received by a slow clock domain according to an embodiment of the invention.

FIG. 7 depicts a flow chart of an exemplary method for capturing a pulse, sent by a fast clock domain 302 and received by a slow clock domain 304 according to an embodiment of the invention. At step 702, a time period may be set at the rising edge of intermediate signal f_1 and may end at the falling edge of signal f_3, as shown in FIGS. 4 and 5.

At step 704, the fast clock domain 302 may notify the slow clock domain 304 of the set time period. For example, the fast clock domain 302 may notify the slow clock domain 304 via the intermediate signal f_1 generated by the set-reset circuit 308. At step 706, an output pulse may be generated by the slow clock domain 304 in synchronism with the input pulse, upon notification of the set time period. For example, first synchronizer 306 may output signal s_2. As described above, signal s_2 and signal s_3 may then be input to OR-gate 309 to generate output signal S_OUT at output terminal S_OUT 332. The output signal S_OUT may have a width of one clock cycle of the slow clock CLKS, as shown at S_OUT 412 of FIG. 4. Alternatively, output signal S_OUT may have a width of multiple clock cycles of the slow clock CLKS, as shown at S_OUT 504 of FIG. 5.

At step 708, the slow clock domain 304 may acknowledge synchronism with the input pulse to the fast clock domain 302. For example, as shown in FIG. 3, signal s_2, output from first synchronizer 306 in slow clock domain 304 may be fed back to second synchronizer 312 in fast clock domain 302. At step 710, the fast clock domain 302 may reset the time period upon receipt of the acknowledgment from the slow clock domain 304. For example, signal f_3, output from second synchronizer 312 may be received by set-reset circuit 308 for resetting the time period. At step 712, the fast clock domain may generate the F-ACK_OUT signal, shown in FIG. 3, in order to enable the next input pulse, F_IN. The method shown in FIG. 7 may loop back to step 702 to set the next time period upon detecting the next input pulse, F_IN.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A circuit for transferring a signal from a fast clock domain to a slow clock domain comprising:
a fast clock domain configured to receive an input signal and, responsively, transfer an intermediate signal,
a slow clock domain configured to receive the transferred intermediate signal from the fast clock domain and, responsively, generate an output signal, and
a first synchronizer disposed in the slow clock domain, and a second synchronizer disposed in the fast clock domain,
wherein the first synchronizer, operating with a slow clock, is configured to receive the intermediate signal and, responsively, provide the output signal as a transferred signal which is synchronized to the input signal,
the second synchronizer, operating with a fast clock, is configured to receive a feedback signal from the first synchronizer for acknowledging synchronization of the output signal to the input signal, and
the second synchronizer is configured to provide an Acknowledge Out signal to an external circuit, which is separate from the fast and slow clock domains, and
the external circuit is configured to disable the input signal unless the Acknowledge Out signal is received by the external circuit.

2. The circuit of claim 1 wherein
the second synchronizer is serially coupled to the first synchronizer,
the first synchronizer, operating first in time sequence, receives the intermediate signal and provides the output signal which is synchronized to the input signal, and
the second synchronizer, operating second in time sequence, receives the feedback signal and provides an acknowledgement signal based on the output signal having been synchronized to the input signal.

3. The circuit of claim 1 further including
a set-reset element, disposed in the fast clock domain, and coupled between an input terminal receiving the input signal and an output terminal providing the intermediate signal,
wherein the set-reset element receives the input signal and generates the intermediate signal, and resets the intermediate signal after a predetermined delay time period.

4. The circuit of claim 1 wherein
an acknowledgement signal, based on the output signal having been synchronized to the input signal, is provided to the fast clock domain, and
until the acknowledgement signal is provided, the fast clock domain is configured to inhibit another transfer of a signal from the fast clock domain to the slow clock domain.

5. The circuit of claim 1 wherein
the first synchronizer and the second synchronizer each include a serial double register, and
the second synchronizer is clocked by the fast clock and the first synchronizer is clocked by the slow clock.

6. The circuit of claim 1 wherein
the input signal has a first time period dependent on the fast clock,
the output signal has a second time period dependent on the slow clock, and
the second time period is configured to be dependent on the first time period.

7. The circuit of claim 6 wherein
the first time period has a width greater than one clock cycle of the fast clock, and
the second time period has a width greater than one clock cycle of the slow clock.

8. The circuit of claim 6 wherein
the first time period has a width of multiple clock cycles of the fast clock, and
the second time period has a width of multiple clock cycles of the slow clock, and
the multiple clock cycles of the fast clock and the slow clock, respectively, are not equal.

9. The circuit of claim 1 wherein
the first synchronizer includes a plurality of serially coupled registers that are clocked by the slow clock, and
a rising edge of the output signal is delayed from a rising edge of the input signal by a number of slow clock cycles that is at least equal to a number of the serially coupled registers.

10. The circuit of claim 9 including
a set-reset element disposed in the fast clock domain for receiving the rising edge of the input signal and generating the intermediate signal for transfer to the first synchronizer,
wherein the output signal is delayed from a rising edge of the intermediate signal by the number of slow clock cycles equal to the number of the serially coupled registers.

11. A circuit for capturing a pulse transferred from a fast clock domain to a slow clock domain comprising:
a set-reset element, disposed in the fast clock domain, for detecting an input pulse and setting a capture period upon detection of the input pulse,
a first synchronizer, disposed in the slow clock domain, for synchronizing to the detected input pulse, after setting of the capture period, and responsively providing an output pulse,
a second synchronizer, disposed in the fast clock domain, for synchronizing to the first synchronizer and responsively providing an acknowledgment signal,
wherein the set-reset element uses the acknowledgement signal for resetting the capture period,
an external inhibitor prevents the input pulse to be transferred to the fast clock domain, and
the acknowledgement signal is provided to the external inhibitor for enabling the input pulse to be transferred to the fast clock domain.

12. The circuit of claim 11 wherein
the first synchronizer includes a plurality of serially coupled first registers for delaying a rising edge of the input pulse by a plurality of slow clock cycles, and for responsively providing the output pulse after completion of the delay.

13. The circuit of claim 12 wherein
the serially coupled first registers are clocked by a slow clock, and
the delaying of the rising edge of the input pulse is based on a number of slow clock cycles, the number of slow clock cycles equal to at least a number of the serially coupled first registers.

14. The circuit of claim 11 wherein
the second synchronizer includes a plurality of serially coupled second registers clocked by a fast clock,
the second synchronizer is configured to delay a sync pulse received from the first synchronizer by a number of fast clock cycles, and the second synchronizer is configured to generate the acknowledgment signal.

15. A method of capturing a pulse, sent by a fast clock domain and received by a slow clock domain, comprising the steps of:
- setting a time period, by the fast clock domain, upon detection of an input pulse;
- notifying the slow clock domain, by the fast clock domain, of the set time period;
- generating an output pulse, by the slow clock domain, in synchronism to the input pulse, upon notification of the set time period;
- acknowledging to the fast clock domain, by the slow clock domain, of synchronism to the input pulse;
- resetting the time period, by the fast clock domain, upon receipt of the acknowledgment from the slow clock domain;
- sending, by the fast clock domain, an Acknowledge Out signal to an external circuit; and
- disabling the input pulse to the fast clock domain, by the external circuit, until receiving the Acknowledge Out signal from the fast clock domain.

16. The method of claim 15 further including the step of:
- enabling, by the fast clock domain, a transfer of another input pulse to the slow clock domain, in response to the acknowledgement received from the slow clock domain.

17. The method of claim 15 wherein
- setting a time period includes providing an intermediate signal to the slow clock domain by the fast clock domain, and
- generating the output pulse includes clocking by a first synchronizer in the slow clock domain, using a slow clock, the intermediate signal to provide synchronism between the input pulse and the output pulse.

18. The method of claim 15 wherein
- the input pulse has a time period of one clock cycle, clocked by a fast clock in the fast clock domain, and
- generating the output pulse includes generating the output pulse to correspond to the input pulse so that the output pulse has a time period of one clock cycle, and
- the output pulse has a time period of one clock cycle, clocked by a slow clock in the slow clock domain.

19. The method of claim 15 wherein
- the input pulse has a time period of multiple clock cycles, clocked by a fast clock in the fast clock domain, and
- generating the output pulse includes generating the output pulse to correspond to the input pulse so that the output pulse has a time period of at least one clock cycle, clocked by a slow clock in the slow clock domain.

20. The method of claim 15 including the step of:
- storing the input pulse, by the external circuit, until the Acknowledge Out signal is received in the external circuit.

21. The circuit of claim 1 including
- a storage device for storing the input signal, until the Acknowledge Out signal is received by the external circuit.

\* \* \* \* \*